C. E. PERKINS.
UNIVERSAL JOINT.
APPLICATION FILED JULY 13, 1916.
1,202,217.
Patented Oct. 24, 1916
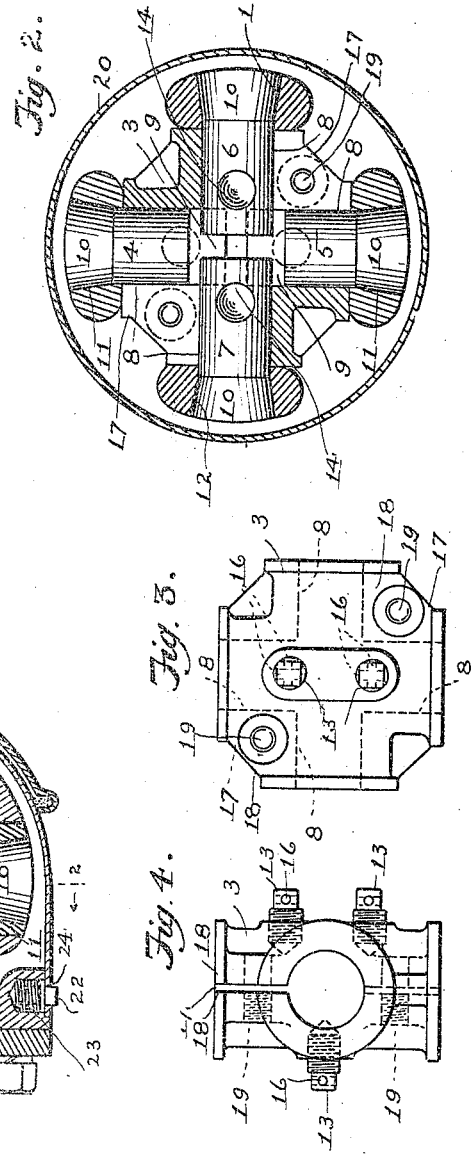
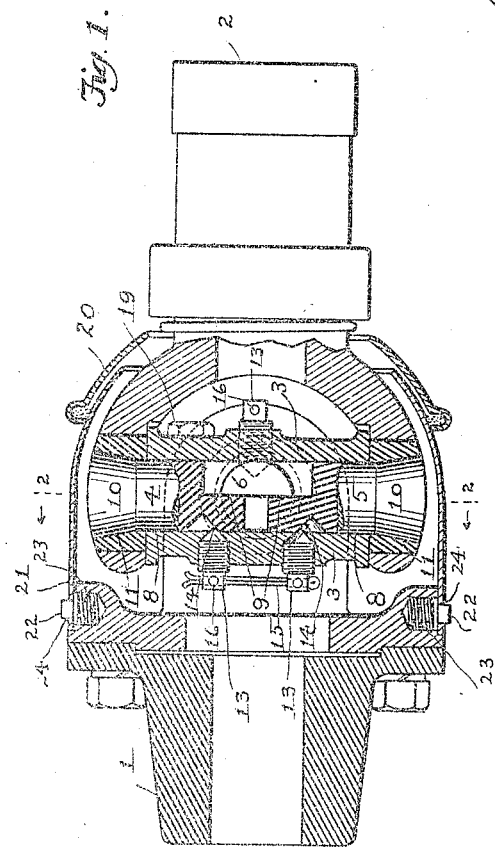
Witness
D. W. Bradford
Inventor
Charles E. Perkins
By Cyrus W. Rice
his Attorney

UNITED STATES PATENT OFFICE.

CHARLES E. PERKINS, OF GRAND RAPIDS, MICHIGAN.

UNIVERSAL JOINT.

1,202,217.  Specification of Letters Patent.  Patented Oct. 24, 1916.

Application filed July 13, 1916. Serial No. 108,970.

*To all whom it may concern:*

Be it known that I, CHARLES E. PERKINS, a citizen of the United States, residing at Grand Rapids, in the county of Kent and State of Michigan, have invented new and useful Improvements in Universal Joints, of which the following is a specification.

My present invention relates to universal joints, such as are employed to connect rotatable shafts not alined; and its object is to provide a joint of that character which shall have improved means for taking up the wear of its bearing parts. This and any other objects appearing hereinafter are attained by, and the invention finds preferable embodiment in, the structure hereinafter described and illustrated by the accompanying drawings, in which:—

Figure 1 is a view, principally in axial section, of a universal joint: Fig. 2 is a cross section of the same on a plane corresponding with line 2—2 of Fig. 1: Fig. 3 is a plan view of the connecting member: and Fig. 4 is a side view of the same.

In the embodiment of my invention chosen for illustration in the drawings and detailed description herein, the rotatable shaft members 1 and 2 (either of which may be the driven shaft) are connected by the connecting member 3. This connecting member rocks by means of suitable bearings on both shaft members. Preferably, such bearings are, as shown, identical as to both shaft members, and therefore such bearings in connection with one (either) shaft member only need be described.

In the construction shown, a pair of oppositely disposed spindles 4, 5, are arranged at right angles to a second pair of spindles 6, 7, as particularly shown in Fig. 2, all the spindles being adjustably slidable longitudinally on the connecting member, as in the slide bearings 8 in said member, and for the purpose hereinafter set forth. The inner portions of each pair of spindles are cut away at 9 on an axial plane or "halved," in order to receive the correspondingly halved inner portions of the other pair; the spindles are thus held against rotation and are enabled to extend inwardly almost to the center of the connecting member. The outer portions 10 of the spindles are of tapering or frusto-conical form, and rock in correspondingly formed bearings—one pair of spindles in such bearings 11 on one shaft member, and the other pair in such bearings 12 on the other shaft member. In the construction illustrated, the spindles' portions 10 taper inwardly. It will be seen that the spindles may be adjusted by sliding them in their bearings 8 to take up the wear of their rock bearings 11 and 12; and means are provided to hold the spindles in such adjustment and to slide them into such adjustment. Preferably, both these ends are accomplished by the set screws 13 threaded in the connecting member and engaging at their inner ends—which are preferably conical—on the face portions 14 of the spindles, which face portions are inclined to the spindles' axes as shown. The said face portions of the spindles and the axes of the engaging screws forming an acute angle, it will be seen that as the screws are turned down, the spindles will be slidably adjusted to take up the wear on their rock bearings, and will be held in such position by the screws. A cotter 15 may be thrust through the holes 16 in the screws provided for either pair of the spindles, in order to hold the screws from turning.

The connecting member may be split in its diagonally opposite portions, as at 17, thus to form clamping parts 18 which may be clamped on the spindles to securely hold them against any movement, by screwing down the screws 19 which pass through one such part and are threaded in the other.

A lubricant-containing casing in shown at 20.

As stated, the bearing connections between the connecting member and one shaft member are desirably identical with those between the connecting member and the other shaft member, as shown; and the connections on the opposite sides of the connecting member between it and either one of the shaft members are desirably identical as shown; description of such connections as to one not being intended to exclude the same connections as to the other.

One member (as the member 21) of the casing 20 may be detachably connected to its shaft member 1 by pins 22 seated in such shaft member and pressed outwardly by springs 23, the outer ends of such pins engaging in holes 24 in such member 21: when the pins are depressed the member 21 may be detached.

The invention being intended to be defined solely by the claims, is not to be limited to or by details of construction shown or described.

I claim:

1. In a universal joint; shaft members; a connecting member therefor; oppositely disposed spindles having tapering portions, one of said spindles being adjustably slidable longitudinally on the connecting member; bearings on one shaft member corresponding with the spindles' tapering portions and in which such portions rock; means for retaining the adjustable spindle in adjusted position; and bearings in which the connecting member rocks on the other shaft member.

2. In a universal joint; shaft members; a connecting member therefor; oppositely disposed spindles having tapering portions, one of said spindles being adjustably slidable longitudinally on the connecting member; bearings on one shaft member corresponding with the spindles' tapering portions and in which such portions rock; means for adjusting the adjustable spindle and for retaining the same in adjusted position; and bearings in which the connecting member rocks on the other shaft member.

3. In a universal joint; shaft members; a connecting member therefor; oppositely disposed spindles having portions tapering inwardly, one of said spindles being adjustably slidable longitudinally on the connecting member; bearings on one shaft member corresponding with the spindles' tapering portions and in which such portions rock; means for retaining the adjustable spindle in adjusted position; and bearings in which the connecting member rocks on the other shaft member.

4. In a universal joint; shaft members; a connecting member therefor; oppositely disposed spindles having portions tapering inwardly, one of said spindles being adjustably slidable longitudinally on the connecting member; bearings on one shaft member corresponding with the spindles' tapering portions and in which such portions rock; means for adjustably sliding the adjustable spindle inwardly and retaining the same in adjusted position; and bearings in which the connecting member rocks on the other shaft member.

5. In a universal joint; shaft members; a connecting member therefor; oppositely disposed spindles having tapering portions, one of said spindles being adjustably slidable longitudinally on the connecting member and having a face portion inclined to its axis; bearings on one shaft member corresponding with the spindles' tapering portions and in which such portions rock; a screw threaded in the connecting member and engaging said face portion, the axis of the screw and the face portion forming an acute angle; and bearings in which the connecting member rocks on the other shaft member.

6. In a universal joint; shaft members; a connecting member therefor; two pairs of spindles having tapering portions, each pair being oppositely disposed, and one of each pair being adjustably slidable longitudinally on the connecting member, and the inner portions of each pair being halved to receive the correspondingly halved inner portions of the other pair; bearings on the shaft members corresponding with the spindles' tapering portions and in which such portions rock; and means for retaining the adjustable spindles in adjusted position.

7. In a universal joint; shaft members; a connecting member therefor; oppositely disposed spindles having tapering portions and being adjustably slidable longitudinally on the connecting member and each having a face portion inclined to its axis; bearings on one shaft member corresponding with the spindles' tapering portions and in which such portions rock; screws threaded in the connecting member and engaging said face portions respectively, the axis of each screw and the face portion engaged by it forming an acute angle; a cotter adapted to engage the screws to prevent their turning; and bearings in which the connecting member rocks on the other shaft member.

8. In a universal joint; shaft members; a connecting member therefor; oppositely disposed spindles having tapering portions, one of said spindles being adjustably slidable longitudinally on the connecting member; bearings on one shaft member corresponding with the spindles' tapering portions and in which such portions rock; a portion of the connecting member being split into clamping parts; a screw adapted to hold said parts in clamping engagement with the adjustable spindle; and bearings in which the connecting member rocks on the other shaft member.

9. In a universal joint; shaft members; a connecting member therefor; a casing covering said joint and having holes therein; and outwardly spring-pressed pins carried on one shaft member and adapted to engage in said holes to detachably connect the casing to said shaft member.

In testimony whereof I have hereunto set my hand in presence of two subscribing witnesses, this tenth day of July, 1916.

CHARLES E. PERKINS.

Witnesses:
 Cyrus W. Rice,
 Dorothy M. Field.